United States Patent [19]

Reinthaler et al.

[11] Patent Number: 5,576,105
[45] Date of Patent: Nov. 19, 1996

[54] TIRE CORE MADE FROM AN IMPROVED POLYESTER FILAMENT YARN

[75] Inventors: Peter Reinthaler, Neuenkirch; Armin Mueller, Emmenbruecke, both of Switzerland

[73] Assignee: Rhone - Poulenc Viscosuisse S.A., Emmenbruecke, Switzerland

[21] Appl. No.: 609,455

[22] Filed: Mar. 1, 1996

Related U.S. Application Data

[60] Division of Ser. No. 523,209, Sep. 5, 1995, which is a continuation-in-part of Ser. No. 934,632, Sep. 14, 1992, abandoned.

[51] Int. Cl.$^6$ .................................................. D02G 3/00
[52] U.S. Cl. ........................ 428/395; 428/364; 428/357; 52/902; 152/451
[58] Field of Search ............................. 428/357, 364, 428/395; 152/451; 57/902

[56] References Cited

U.S. PATENT DOCUMENTS 3,526,607  9/1970  Brown et al. .
4,121,901  10/1978  Bourrain et al. ........................ 428/395
5,045,260  9/1991  Humbrecht ............................. 264/103

FOREIGN PATENT DOCUMENTS 1246787  of 0000  Canada .

*Primary Examiner*—Newton Edwards
*Attorney, Agent, or Firm*—Michael J. Striker

[57] ABSTRACT

The method of making a pre-adherized polyester filament yarn with adhesion properties for rubber includes applying a pre-adherizing agent to a polyester filament yarn having a boiling water shrinkage value of <20% while spinning it at not less than 3200 m/min, heat treating the pre-adherized polyester filament yarn with hot air on a bobbin for several days at from 50° to 90° C., and then subjecting the conditioned POY to a single drawing step in which the take-off speed is 1.7 to 2.2 times faster than the inlet speed. Impregnated tire cord made from the polyester filament yarn so treated has a tensile strength of 60 to 70 cN/tex and a tempered shrinkage test value at 190° C. of less than 3.5%, an adhesive power of 18 to 25 daN to rubber, an appearance grade of 2.5–4.0 and a dimensional stability value of greater than 24,000 cN/tex$^2$.

3 Claims, 4 Drawing Sheets

TIRE CORE MADE FROM AN IMPROVED POLYESTER FILAMENT YARN

The present application is a division of application Ser. No. 08/523,209 filed Sep. 5, 1995, now allowed which is a continuation-in-part application of U.S. patent application Ser. No. 07/934,632, Sep. 14, 1992, now abandoned.

BACKGROUND OF THE INVENTION

The present invention relates to a process for producing a pre-adherized polyester filament yarn having adhesion properties for rubber, to the polyester filament yarn made by that process and to impregnated tire cord made from pre-adherized polyester filament yarn.

Pre-adherizing methods for producing low-shrinkage polyester yarns which are high in tenacity and low in extensibility, even for industrial purposes, is known. For instance, WO 84/03707 describes a process in which suitable adhesion properties for rubber are provided by the application of a polyepoxide and of a tertiary amine as catalyst to polyester filament yarn after drawing. In this process, the amount of catalyst added is of considerable importance.

A combined process for simultaneous heat treatment and drawing of undrawn or fully drawn yarns is known from DE-A-2 056 707. This kind of process is possible at spinning speeds below 1000 m/min. At higher spinning speeds, as employed in the POY region, the pin and bobbin units are clogged so rapidly following application of a pre-adherizer as to make economical working impossible.

Existing methods solve the above mentioned problems for making tire cord only partly, since they do improve the adhesion properties of the polyester filament yarns for rubber but a tire cord produced therefrom is not a priori dimension stable. The dimension stability of tire cord, which is defined as the product of the breaking elongation or strength and the initial modulus divided by the thermal shrinkage, is an important property of polyester yarn as described in U.S. Pat. No. 5,045,260 issued to Remy Humbrecht, et al. A higher dimension stability indicates, for example, that tire cord made from the polyester yarn deforms less at high temperature and under various continued stresses.

The production of dimension stable polyester (PET) cord presupposes the spinning of preoriented, partially drawn yarn (POY). This can be accomplished by increasing the spinning speed. There have admittedly been proposals for keeping the spinning speed low by reducing the filament linear density, but this sharply increases the number of individual filaments making up the multifilament yarn, so that more filament breakages can occur in drawing. If, by contrast, the filament linear density is held at between 4.4 to 6 dtex/filament, adequate dimension stability in the tire cord can be achieved only if the preoriented, partially drawn yarn is spun at high speeds (>2500 m/min).

Although residual drawability decreases with increasing spinning speed, the circumferential speeds of the drawing rolls and of the windup units increase continuously in the process. Consequently, the spin-drawing process has not only technical, for example speed related, but also economic, wear-related limits.

Drawing in a second operation separate from and at a slower speed than the spinning of the POY therefore represents an excellent alternative for producing dimension stable PET cords. However, in that case the application of the adhesion-improving substances only as the drawn yarn is being wound up must then be effected using a multiplicity of applicators, which makes the equipment complicated and uneconomical.

SUMMARY OF THE INVENTION

It is an object of the present invention to provide an improved process for producing in an economic manner a polyester filament yarn that possesses improved adhesion for rubber and from which can be produced a tire cord which also possesses excellent dimension stability.

It is also an object of the present invention to provide an improved pre-adherized polyester filament yarn and improved impregnated tire cord having excellent dimension stability.

These objects are achieved according to the invention when 0.05 to 0.20% by weight of the pre-adherizer based on the weight of fiber subject to the application of the pre-adherizer (i.e. 0.05% by weight of pre-adherizer means 0.05 grams of pre-adherizer per 1.00 gram of fiber or POY) is applied in a first process step to a partially oriented polyester filament yarn (POY) while spinning the POY at not less than 3200 m/min, the POY being limited to partially oriented polyester filament yarn having a boiling water shrinkage value <20%; the spun partially oriented polyester filament yarn with the pre-adherizer applied is then treated in a second process step with hot air at temperatures from 50° to 90° C. for 3 to 5 days and then in a third process step is drawn and wound up again to form the pre-adherized polyester filament yarn.

The pre-adherizers used in the first process step of the method according to the invention include those described in the above-mentioned reference WO 84/03707. In a preferred embodiment of the process the pre-adherizer is, for example, a composition containing a polyepoxide adhesive, an amine catalyt and and a solvent. The polyepoxide can be saturated, unsaturated, aliphatic, cycloaliphatic, aromatic, heterocyclic or substituted. The polyepoxides can be either monomers or polymers with at least two epoxy groups per molecule. Examples of preferred polyepoxides include tris-(epoxypropoxy-2,3)-3-propionyl-1,3,5-hexahydro-s-triazine, butanedioldiglycidylether, hexahydrotriazine and glycerintriglycidylether. The amine catalyst can be a tertiary amine such as N,N-dimethylbenzylamine, 3-diethylamino-1-propylamine, 3-dimethylamino-1-propylamine, tribenzylamine, triethanolamine or triethylamine. The solvent can be water or a water/ethanol solution.

The preferred pre-adherizer composition is an aqueous or aqueous/alcoholic solution which contains 35% by weight polyepoxide, e.g. tris-(epoxypropoxy-2,3)-3-propionyl-1,3, 5-hexahydro-s-triazine, and contains 100 ppm tertiary amine, e.g. triethylamine amine. The alcohol component of the aqueous solution can be ethanol.

The pre-adherizer is advantageously applied during the spinning step at a location between the spin finishing and the wind-up of the partially oriented polyester filament yarn on a wind-up means, preferably a bobbin.

The application of the pre-adherizer during the spinning of a partially drawn polyester filament yarn from a spinneret, for example, has the advantage that only few applicators are needed and that the pre-adherizer penetrates more deeply into the yarn matrix, thus improving the adhesion effect.

However, this application of the pre-adherizer during the spinning step in the manner described above does not alone solve the problem of clogging of the regions of the apparatus with which the freshly pre-adherized yarn comes into contact subsequently. It was found, surprisingly and unexpectedly, that a hot air treatment of the POY carried out at temperatures between 50° and 90° C. prior to drawing prevents the clogging of the regions of the apparatus (rollers, heaters). At these temperatures shrinkage of the POY is inevitable.

It was found that this is acceptable without disadvantages for further processing when the feed POY has a boiling water shrinkage value of less than 20% as mentioned above, and preferably 8–18%, in particular 10–15%, and was spun from a polyester melt (>85% of polyethylene terephthalate) at takeoff speeds of 3400–4000 m/min, in particular 3500 m/min.

From the birefringence and the boiling water shrinkage value measured on the undrawn filament yarn it may be considered partly crystalline POY. In contrast to other POYs its low boiling water shrinkage value makes it possible to subject it to a hot air treatment without jeopardizing its good properties.

The hot air treatment of the partially drawn pre-adherized polyester filament yarn is preferably carried out on the POY package at 60° to 80° C. preferably at 70° C., for 3 to 5 days. A longer treatment time is possible, but uneconomical.

If the boiling water shrinkage value is too high, the hot air treatment gives rise to excessive shrinkage forces, which results in pronounced deformation of the package and of the package support. Deformed packages are no longer efficiently processible.

It is also surprising that such highly oriented POY is not only convertible into highly dimension stable cord but is also drawable in a very simple manner in a single drawing zone after the second heat treatment step by passing the conditioned partially oriented polyester filament yarn over a cold feed roller; a fixed drawing point, for example a snubbing pin; a suitable heater, for example a hot plate; a cold drawing roller and a windup means, such as a motorized take-up roller.

If the boiling water shrinkage value is too high, this form of drawing gives rise to difficulties. If the boiling water shrinkage value is too low, the dimensional stability, DS, does increase slightly, but the process becomes increasingly uneconomic, since the draw ratio and hence the machine output decrease relatively more rapidly than the boiling water shrinkage value.

The resulting pre-adherized polyester filament yarn has the following properties at one and the same time:

Tenacity 60–70 cN/tex
HASH <3.5% at 235° C., measured at 190° C.
DS >24000 cN$^2$/tex$^2$ where HASH is the hot air shrinkage after heat treatment and DS the dimensional stability. The HASH, tenacity and DS can be measured by well known measurement methods, for example as the methods used to obtain the results described in U.S. Pat. No. 5,045,260.

In the HASH test a conditioned yarn sample under a load of 0.4 cN/dtex is exposed to a temperature of 235° C. for 1 minute. The load is then reduced to 0.01 cN/dtex and the sample is allowed to cool down to room temperature. Finally, the same sample is heated up under the same load at a temperature gradient of 20 K/min and the residual shrinkage is measured at 190° C.

The DS is used to predict from the properties of a multifilament yarn the likely dimension stability of impregnated cord. The higher the DS, the better the dimension stability of the impregnated cord. As mentioned previously, $DS=Ft \times Mo/TS,$ wherein Ft=tenacity, Mo=specific initial modulus and TS is the thermal shrinkage or HASH.

The pre-adherized polyester filament yarn is used as an intermediate for producing impregnated or unimpregnated tire cord for a vulcanized ready-produced tire which has an adhesive power of 18 to 25 daN to rubber, a rubber adhesion (pull) of from 18 daN to 25 daN, an appearance rating of from 2.5 to 4.0 and usually a breaking strength of the impregnated cord is higher than or at least the same as that of the unimpregnated cord. Also the tire cord advantageously in a preferred embodiment has a tensile strength of 60 to 70 cN/tex and a tempered shrinkage test value at 190° C. of less than 3.5%.

BRIEF DESCRIPTION OF THE DRAWING

The objects, features and advantages of the present invention will now be illustrated in more detail by the following detailed description including examples, reference being made to the accompanying drawing in which.

DESCRIPTION OF THE PREFERRED EMBODIMENTS

Figure 1:
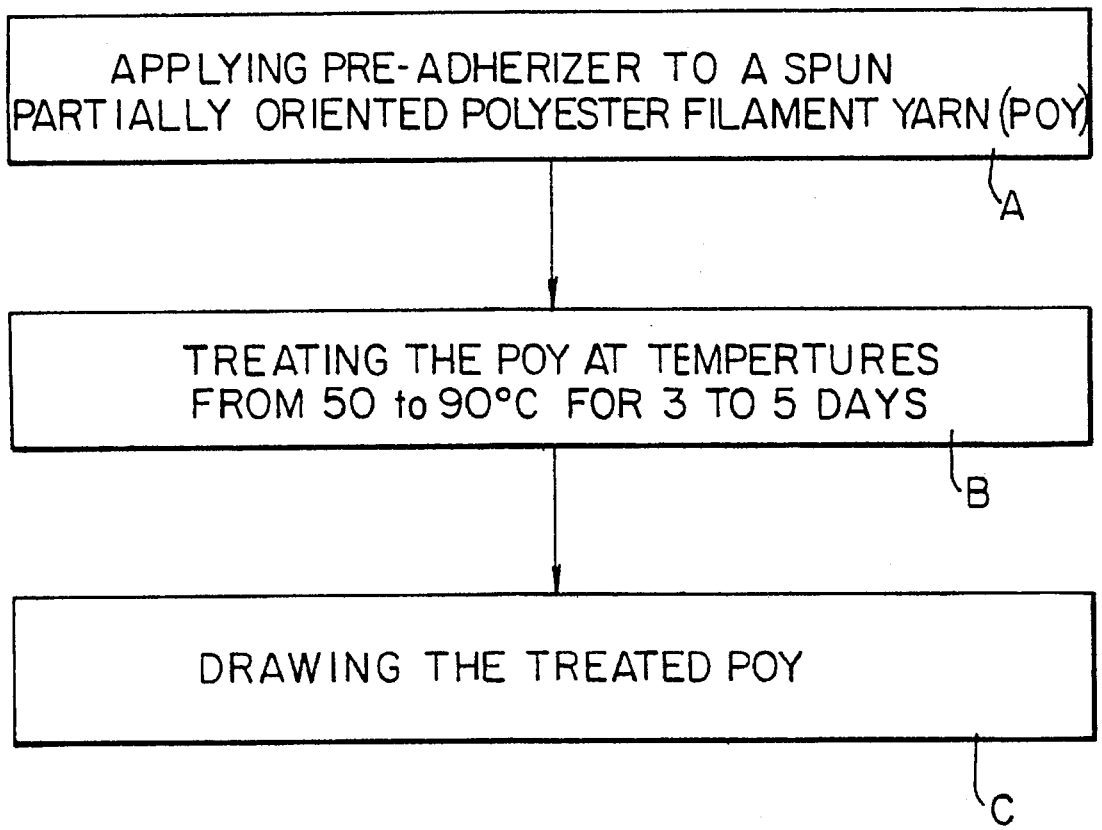
FIG. 1 is a flow chart showing the basic steps of the process for making a pre-adherized polyester filament yarn according to the invention.

The basic steps of the process according to the invention are shown in FIG. 1 and include applying 0.05 to 0.20% by weight of the pre-adherizer based on the weight of fiber (POY starting material) subject to the application of the pre-adherizer in a first process step A to a partially oriented polyester filament yarn (POY) as it is being spun at not less than 3200 m/min. By "fiber" the partially oriented polyester filament yarn is meant. The method is limited to partially oriented polyester filament yarn having a boiling water shrinkage value <20%.

The preferred pre-adherizer is applied between the spin finishing device and the bobbin on which the POY is wound and comprises an aqueous solution containing 35% by weight polyepoxide, 100 ppm of tertiary amine, e.g. triethylamine, and the balance water. The solvent used could also be water/ethanol. The polyepoxide is advantageously tris-(epoxypropoxy-2,3)-3-propionyl-1,3,5-hexahydro-s-triazine.

The pre-adherized partially oriented polyester filament yarn formed in the first process step A is then treated in a second process step B with hot air at temperatures from 50° to 90° C. for 3 to 5 days. Then in a third process step C the heat treated pre-adherized polyester filament yarn is drawn again to form a pre-adherized polyester filament yarn product of the process.

Figure 2:
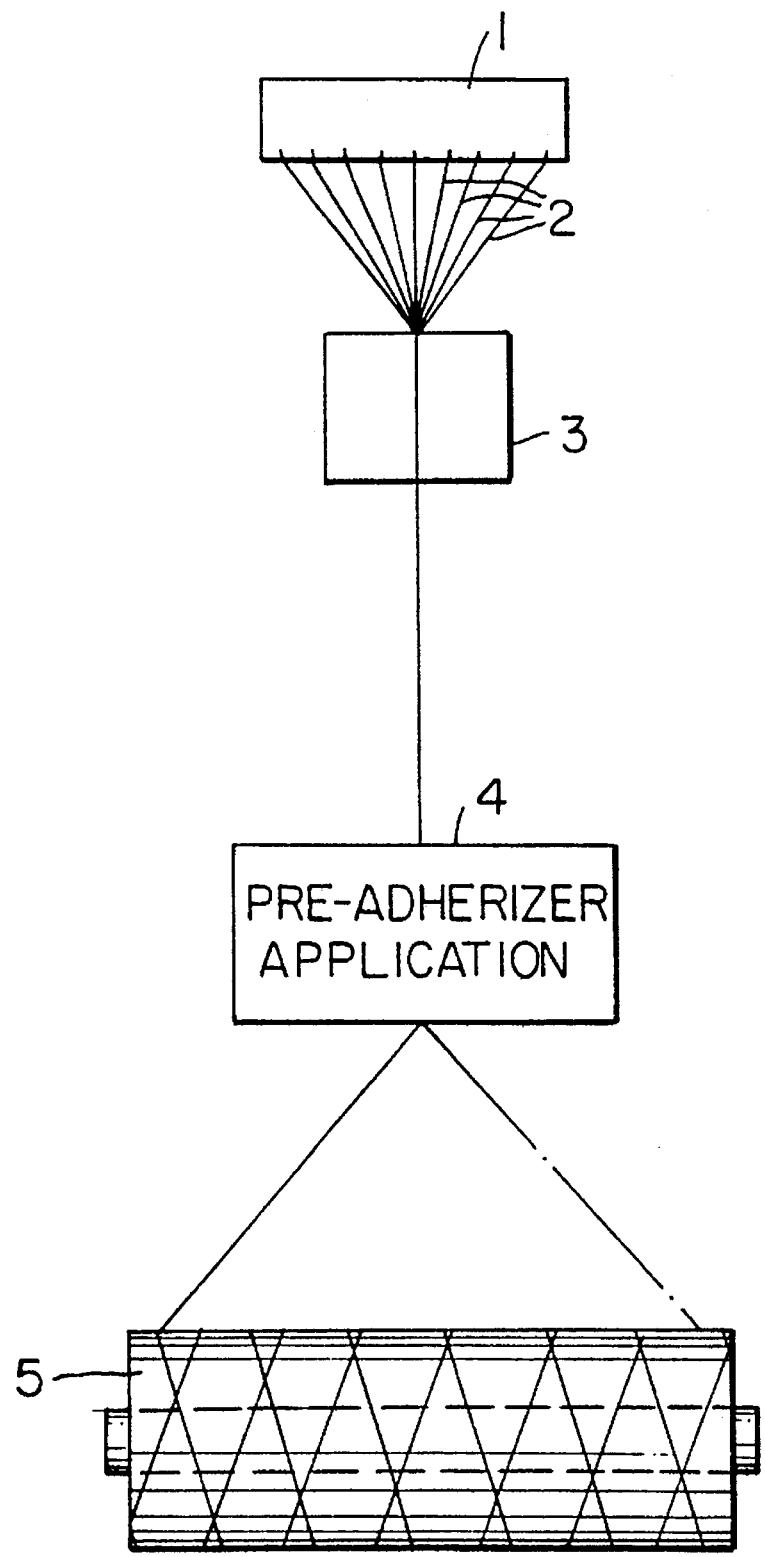
FIG. 2 is a schematic diagram showing apparatus used to perform the first step of the process shown in FIG. 1.
Figure 3:
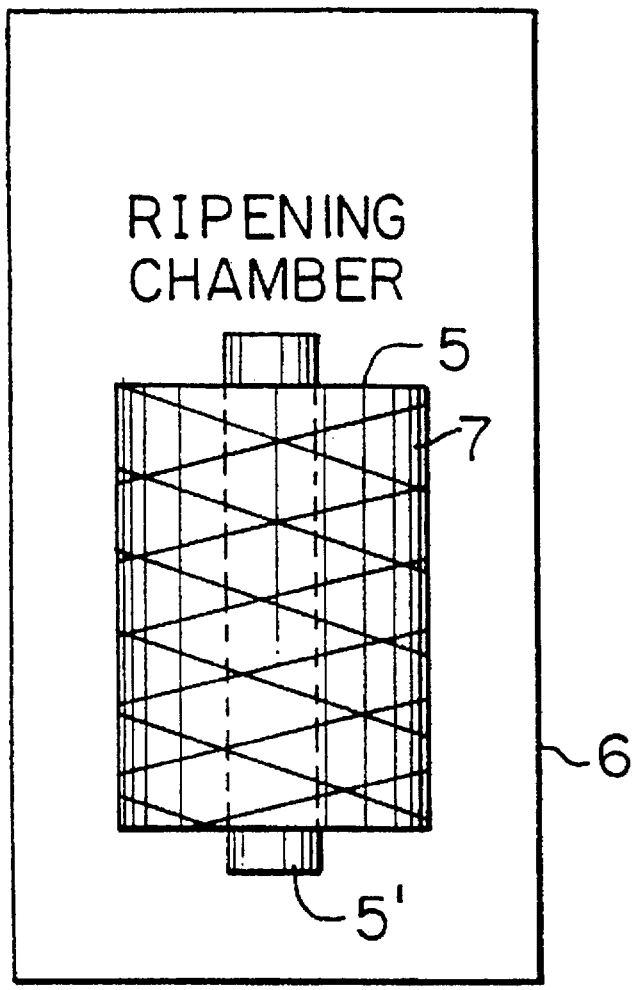
FIG. 3 is a schematic diagram showing apparatus used to perform the second step of the process shown in FIG. 1.
Figure 4:
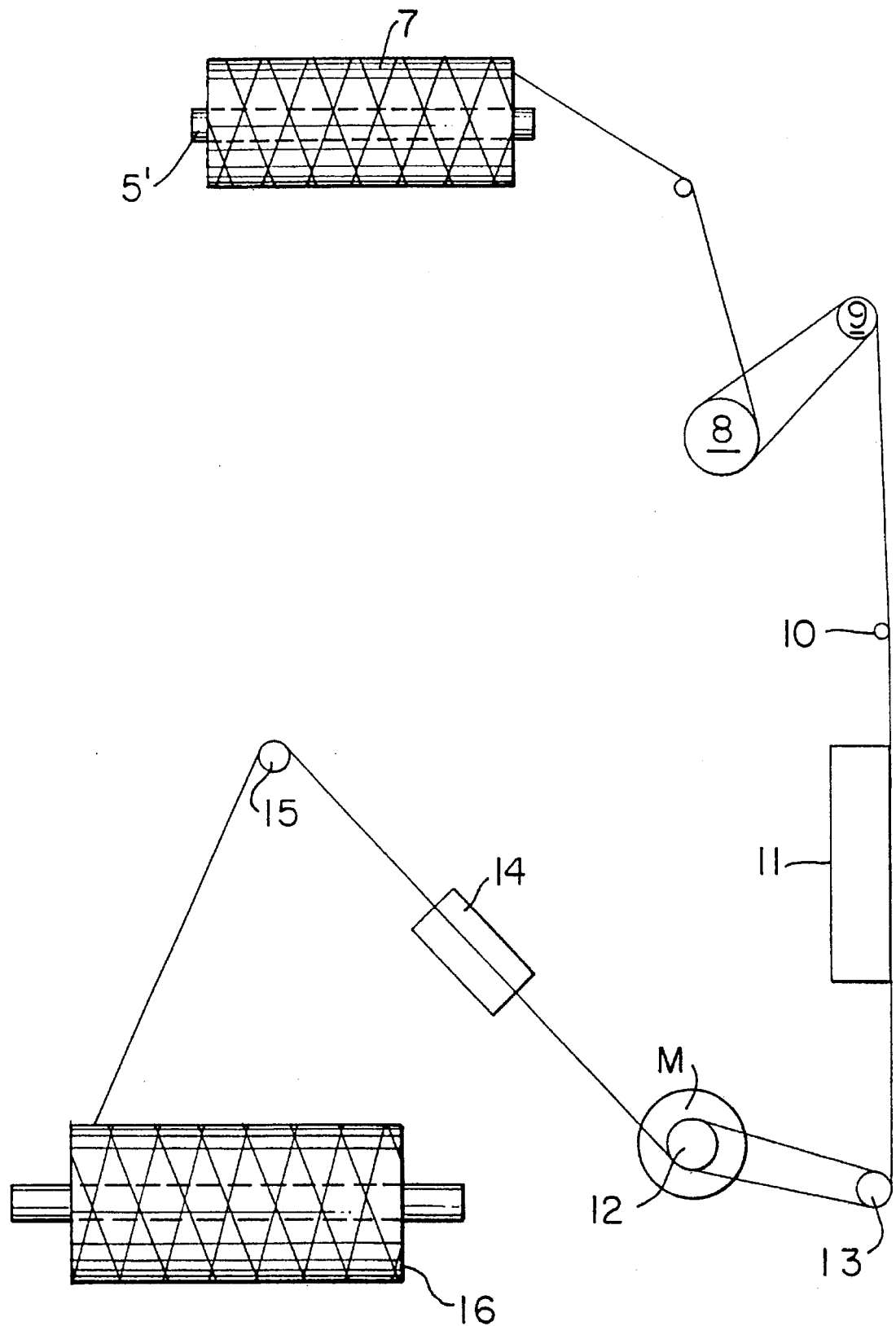
FIG. 4 is a schematic diagram showing apparatus used to perform the third step of the process for making a pre-adherized polyester filament yarn of FIG. 1.

The three process steps A, B and C are shown in detail in FIGS. 2 to 4.

The first process step A is shown diagrammatically in FIG. 2. A plurality or set of polyester filaments 2 originate from the spin device 1. The set of polyester filaments 2 is conventionally bundled together and spin finished with spin finishing device 3. As the multifilament polyester yarn 2 is wound up on a bobbin 5 at for example 3500 m/min, it becomes a partially oriented multifilament polyester yarn (POY). This partially drawn yarn produced with a take-off speed of 3500 m/min is pre-adherized with the pre-adherizing device 4 located between the bobbin 5 and the spin finishing device 3. Then in the second process step B the resulting POY package 5 is treated with hot air at about 70° C. in a ripening chamber 6 for several days. The result is a package 7 of ripened or heat treated POY. In the third process step C the ripened POY is unwound from the package 7 and passes around feed roller 8 provided with spacer roll 9, then over a snubbing pin 10, a hot plate 11, around an additional spacer roll 13 and finally around motor-driven take-off roller 12. The takeoff roller 12 is driven by motor M and draws the yarn over the snubbing pin 10 and the hot plate, which is heated to about 240° C. at a speed of at least 200 m/min. This speed is 1.7–2.2 times greater than the inlet speed (i.e., the speed of feed roller 8).

The drawn polyester filament yarn may additionally be entangled via an interlacer 14, deflected via a deflecting roller 15 and wound up onto a package 16.

EXAMPLES 1–2

Granular polyethylene terephthalate (PET) made from ethylene terephthalate units as its main component and having an intrinsic viscosity (IV) of 0.65 (determined in a solution in phenol/tetrachloroethane) was post-condensed in the solid state to an intrinsic viscosity of 1.0. The granules were melted in an extruder at 290° C. and conventionally metered by a gear pump and forced at about 310° C. through a spinneret having a multiplicity of capillary bores. The capillary diameter was 0.4 mm and the capillary length was 1.6 mm. The resulting filament bundle was initially conditioned in a tubular afterheater and then conventionally cooled with air, spin finished, converged and wound up on a wind-up means, preferably a bobbin, at a speed between 3200 m/min and 3800 m/min. The exact speed can vary with the apparatus used, the air temperature, humidity, throughput and as-spun linear density. The preferred pre-adherizer as described above is applied to the POY in the manner described above between the spin finishing device and the bobbin.

The package was subjected to a hot air treatment at 70° C. for 3 days in process step B. The multifilament yarn was then drawn in the third process step C according to the invention and cabled to form a tire cord (1100 Z492) x2 S492 or (1440 Z394) x2 S394 and thereafter impregnated in a single bath.

The impregnation was carried out with a small scale impregnator (Computreater from LITZLER) according to the following scheme:

a) dipping unimpregnated tire cord in a conventional DIP consisting of 16% resorcinol-formaldehyde latex to form an impregnated product;

b) drying the impregnated tire cord in a drying oven with a yarn tension $K_1$ at a temperature $T_1$ for a residence time of t1;

c) after step b), passing the impregnated tire cord through a drawing oven with a yarn tension $K_2$ at a temperature $T_2$ for a residence time of t2; and d) after step c), passing the impregnated tire cord through a drawing oven with a yarn tension $K_3$ at a temperature $T_3$ and with a residence time of t3.

TABLE I

Conditions for Tire Cord Preparation Process

| Example No. | 1 | 2 |
|---|---|---|
| Yarn tension [cN] | | |
| $K_1$ | 300 | 300 |
| $K_2$ | 1200 | 1600 |
| $K_3$ | 400 | 520 |
| Temperature [°C.] | | |
| $T_1$ | 160 | 160 |
| $T_2$ | 240 | 240 |
| $T_3$ | 220 | 220 |
| Residence time [s] | | |
| t1 | 45 | 45 |
| t2 | 45 | 45 |
| t3 | 63 | 63 |

Under these impregnating conditions the tire cord was afterdrawn at 240° C. under a tension of 0.45–0.5 cN/dtex and relaxed at 220° C. against a tension of 0.1 cN/dtex.

TABLE II

Properties of POY Starting Material, Pre-adherized Polyester Filament Yarn, Unimpreganted Tire Cord made from the Pre-adherized Polyester Filament Yarn and Impregnated Tire Cord Made by the Method of Examples 1–2

| Example No. | 1 | 2 |
|---|---|---|
| POY | | |
| Spinning speed [m/min] | 3500 | 3500 |
| Boiling water shrinkage [%] | 8.2 | 17.3 |
| Birefringence | 0.089 | 0.068 |
| Yarn drawn | | |
| Linear density [dtex] | 1100 | 1440 |
| Viscosity [dl/g] | 0.90 | 0.92 |
| Breaking strength [N] | 75.7 | 99.7 |
| Tenacity [cN/tex] | 67.5 | 69.3 |
| Breaking extension [%] | 11.2 | 10.4 |
| HASH at 190° C. [%] | 3.1 | 3.3 |
| DS [cN²/tex²] | 25890 | 27120 |
| Birefringence | 0.182 | 0.193 |
| Unimpregnated cord | | |
| Twist [turns/m] Z/S | 492/492 | 394/394 |
| Linear density [dtex] | 2532 | 3288 |
| Breaking strength [N] | 137.0 | 177.6 |
| Breaking extension [%] | 17.2 | 16.7 |
| Impregnated cord | | |
| Linear density [dtex] | 2656 | 3472 |
| Breaking strength [N] | 141.8 | 183.3 |
| Gain [%] | 2.3 | 3.1 |
| Tenacity [cN/tex] | 52.7 | 53.3 |
| Breaking extension [%] | 15.4 | 16.2 |
| Reference extension*) [%] | 4.8 | 4.5 |
| HAS at 160° C. [%] | 1.3 | 1.8 |
| Sum total (reference extension + HAS160) [%] | 6.1 | 6.3 |
| | 6.1 | 6.3 |
| In rubber tests | | |
| Strip pull [daN] | 20.5 | 25.0 |
| appearance | 3.25 | 3.5 |

*)44N for 1100 dtex yarn and 57N for 1440 dtex yarn

A filament yarn thus produced not only has a high dimension stability of more than 24,000 cN²/tex², but the tire cord made from it has in addition excellent adhesion properties in rubber. Normally it is found that the process of impregnation results in a loss of breaking strength of the impregnated cord compared with the unimpregnated cord. The tire cord produced by the process of the invention from the pre-adherized polyester filament yarn not only does not exhibit this type of breaking strength loss, but in fact shows a gain in breaking strength of more than 2%.

The tire cord is particularly suitable for producing automobile and airplane tires and for tarpaulins, hose pipes, conveyor belts and V-belts.

While the invention has been illustrated and described as embodied in a process for producing a pre-adherized polyester filament yarn having adhesion properties for rubber, to the polyester filament yarn made by that process and to tire cord made from pre-adherized polyester filament yarn, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. A tire cord made from a pre-adherized polyester filament yarn produced by a process including the steps of:

a) melt-spinning at spinning speeds of 3200 m/min to 3800 m/min to obtain a partially oriented polyester filament yarn having a boiling water shrinkage value <20%;

b) spin-finishing the partially oriented polyester filament yarn;

c) after the spin-finishing, applying 0.05 to 0.20% by weight of a pre-adherizer composition, based on fiber weight, to the partially oriented polyester filament yarn while the filament yarn is running;

d) after the applying, taking up the filament yarn on a bobbin at a take-up speed of 3200 to 3800 m/min and treating the partially oriented polyester filament yarn on the bobbin with hot air at temperatures from 50° to 90° C. for 3 to 5 days to form a conditioned partially oriented polyester filament yarn; and then e) drawing, in a single process step, by passing said conditioned partially oriented polyester filament yarn over a feed roller, a snubbing pin and a hot plate and by pulling the conditioned partially oriented polyester filament yarn over the snubbing pin and the hot plate with a motor-driven take-off roller to form the pre-adherized polyester filament yarn;

wherein said pre-adherized polyester filament yarn has a dimension stability DS of >24,000 $cN^2/tex^2$, a tenacity of from 60 to 70 cN/tex and a hot air shrinkage value at 190° C. of <3.5%, said hot air shrinkage value being obtained by exposing a yarn sample of said pre-adherized polyester filament yarn under a load of 0.4 cN/dtex to a temperature of 235° C. for 60 seconds, allowing the yarn sample to cool down to room temperature under a load of 0.01 cN/dtex, heating the yarn sample under the load of 0.01 cN/dtex at a temperature rate of 20 K/min and then measuring a residual shrinkage of the yarn sample at 190° C.; so that the tire cord has a rubber adhesion of from 18 daN to 25 daN, an appearance grade of from 2.5 to 4.0 and a breaking strength after impregnation not less than that prior to impregnation.

2. The tire cord as defined in claim 1, wherein said pre-adherizer composition contains a polyepoxide adhesive, an amine catalyst and a solvent.

3. The tare cord as defined in claim 2, wherein said pre-adherizer composition is an aqueous solution containing 35% by weight of said polyepoxide, 100 ppm of triethylamine acting as said amine catalyst and a remaining portion of water, and said polyepoxide is tris-(epoxypropoxy-2,3)-3-propionyl-1,3,5-hexahydro-s-triazine.

* * * * *